United States Patent [19]
Link

[11] 3,878,314
[45] Apr. 15, 1975

[54] PROTECTIVE APPARATUS FOR UNDERGROUND HIGH VOLTAGE ELECTRICAL DEVICES

[75] Inventor: Edwin A. Link, Waukesha, Wis.

[73] Assignee: RTE Corporation, Waukesha, Wis.

[22] Filed: Oct. 26, 1973

[21] Appl. No.: 410,043

[52] U.S. Cl............ 174/37; 174/17 LF; 200/150 A; 200/150 C; 200/302
[51] Int. Cl........................ H01h 9/02; H05k 5/02
[58] Field of Search............ 174/14 R, 17 R, 17 LF, 174/17 VA, 17 CT, 37, 38, 11 R, 12 R; 200/150 R, 150 A, 150 C, 150 J, 150 H, 302; 337/204; 336/58, 94; 220/85 TC

[56] References Cited
UNITED STATES PATENTS

| | | | |
|---|---|---|---|
| 461,239 | 10/1891 | Foster | 174/38 X |
| 1,437,232 | 11/1922 | Frank | 174/14 R UX |
| 1,725,623 | 8/1929 | Dickenson | 174/11 R UX |
| 1,931,455 | 10/1933 | Clark | 174/17 LF UX |
| 1,996,423 | 4/1935 | Jansson | 174/12 R |
| 3,250,869 | 5/1966 | Link | 174/17 R X |

Primary Examiner—Laramie E. Askin
Attorney, Agent, or Firm—Ronald E. Barry

[57] ABSTRACT

A protective apparatus for underground high voltage electrical devices including a housing which is adapted to be buried in the ground and to contain the electrical device, a housing extension sealed to said housing to provide communication from ground level to the electrical device, an actuator supported in the extension for actuating the device from the ground surface, a fluid dielectric medium substantially completely filling the housing and extension and having a specific gravity greater than water whereby any water entering the housing or extension will accumulate at the top of the fluid medium, a cap telescopically mounted on the extension for adapting the top of the extension to variations in ground level, and a layer of porous material between the cap and the extension to allow water accumulated on the fluid medium to escape from the apparatus.

9 Claims, 1 Drawing Figure

PATENTED APR 1 5 1975   3,878,314
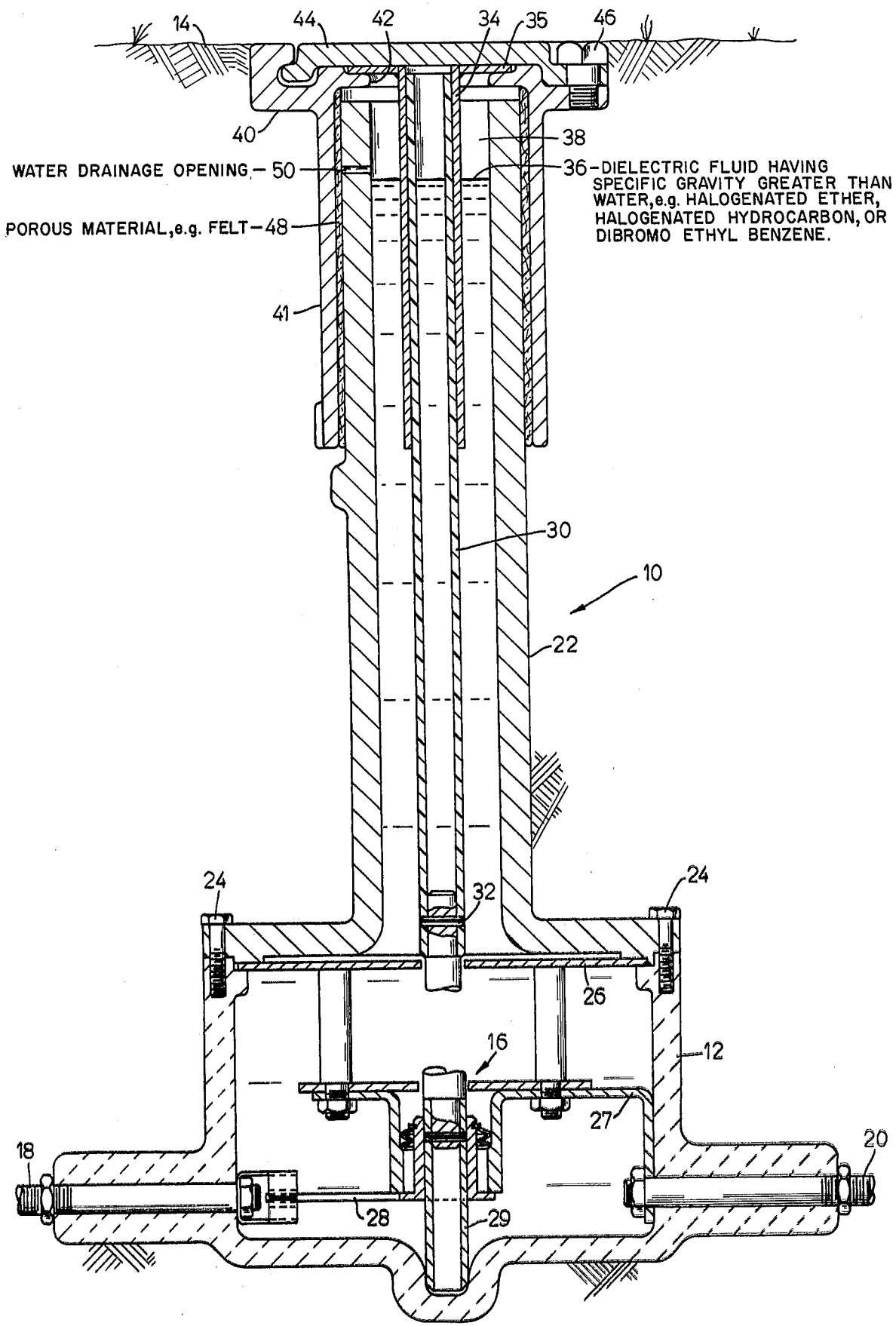

PROTECTIVE APPARATUS FOR UNDERGROUND HIGH VOLTAGE ELECTRICAL DEVICES

BACKGROUND OF THE INVENTION

The trend toward underground high voltage distribution systems has resulted in a need for new apparatus for housing the electrical device. Electrical devices are presently buried in the ground and often become contaminated as a result of the absorption or accumulation of water from the surrounding environment. An accumulation of water of any substantial amount in the housing for an electrical device will produce a short in the system. Efforts to overcome this problem have been directed primarily to the development of improved water impervious materials for the housings and seals for such housings to protect the electrical device from water.

SUMMARY OF THE INVENTION

The underground high voltage protective apparatus of the present invention will provide complete protection from water for any underground electrical device. The apparatus includes a housing which is filled with an insulating fluid having a specific gravity greater than water so that any water which enters the housing will accumulate at the top of the fluid. A telescopic type cap is provided for adapting the apparatus to variations in ground level and also to allow for the escape of water which might accumulate in the housing. Other objects and advantages of the present invention will appear hereinafter as this disclosure progresses, reference being had to the accompanying drawing.

BRIEF DESCRIPTION OF THE DRAWING

The single FIGURE in the drawing is a sectional side view in elevation of an electric switch housed within the protective apparatus of the present invention.

DESCRIPTION OF THE INVENTION

Referring to the drawing, the protective apparatus 10 of the present invention is shown for an underground electrical device 16 in the form of a switch. The apparatus includes a housing 12 formed from a water impermeable material such as metal, porcelain or plastic. The housing is adapted to be buried below ground level 14. Means are provided in the housing for connecting the electrical device 16 to a high voltage source. Such means is in the form of a primary cable connector 18 and a secondary cable connector 20. In a metal housing bushings are provided for connectors 18 and 20.

The housing 12 is closed by means of hollow tubular extension 22 which is secured to the housing 12 by bolts 24. It should be understood that a gasket can be used to seal the housing 12 and extension 22 although none has been shown.

The switch 16 is supported in housing 12 by means of a plate 26 locked between the housing 12 and the extension 22. The secondary connector 20 is connected to the primary connector 18 through an electrically conductive fixed plate 27 and a switch blade 28 mounted on a rotary shaft 29. Although the electrical device 16 has been shown as a switch, it should be understood that switch and submersible fuse combinations can be used herein and the required circuit configurations incorporated into the housing.

The switch 16 is operated from ground level by means of a switch actuator 30 supported within the extension 22. The actuator 30 is formed from a dielectric material such as a plastic and is connected to the shaft 29 by means of a pin 32. The upper end of the actuator 30 is located approximately at ground level and an adjustable actuator element 34 having a radial flange 35 at the top is telescopically received on the upper end of the switch actuator 30 to provide for variations in the ground level as described hereinafter.

In accordance with the invention, the housing 12 and extension 22 are substantially completely filled with a fluid dielectric medium 36 which has a specific gravity greater than water. Mediums which have been found adaptable for use for this purpose are a halogenated ether, halogenated hydrocarbon or dibromo ethyl benzene (a Dow Chemical Corporation product sold under the trademark ALKAZENE 42). This fluid has a specific gravity of approximately 1.7 and will cause any water which enters the housing 12 or extension 22 to accumulate in the space 38 at the top of the extension 22.

Means are provided for adjusting the top of the extension 22 to variations in the ground level. Such means is in the form of a cap 40 having a body portion 41 which is telescopically received on the upper end of the extension 22. The cap includes an inwardly directed flange 42 which is positioned to engage the flange 35 provided at the upper end of the adapter 34. The adapter 34 then being movable with the cap 40 when adjustments are made to ground level. The cap 40 can be closed by means of a cover 44 which is secured to the cap by means of a bolt 46.

Means are provided to allow for the escape of water which accumulates in the space 38. Such means are in the form of a layer 48 of porous material provided between the body portion 41 of the cap 40 and the extension 22. The porous material can be any material that is not subject to corrosion or contamination such as felt. An opening or port 50 can be located in the side wall of extension 22 above the level of the liquid 36 to allow water to escape.

I claim:

1. A protective apparatus for separating water from a high voltage electrical device comprising:
   a housing having an opening at the top,
   an electrical device in said housing,
   means closing the opening at the top of said housing,
   means within said housing for actuating said device from ground level,
   a fluid dielectric medium substantially filling said housing,
   said medium having a specific gravity greater than water whereby any water entering the housing will accumulate on the surface of the dielectric medium,
   and means in said closing means for allowing water accumulated at the top of said dielectric medium to escape from said closing means.

2. The apparatus according to claim 1 wherein said closing means includes a hollow extension connected to said housing to provide communication to ground level and a cap telescopically received over the top of the extension and wherein said escape means includes a layer of porous material positioned between the cap and the extension.

3. The apparatus according to claim 2 wherein said porous material comprises a layer of felt.

4. The apparatus according to claim 1 wherein said fluid medium comprises dibromo ethyl benzene.

5. An underground high voltage protective apparatus said apparatus comprising:
- a housing adapted to be buried in the ground,
- an opening at the top of said housing,
- an electrical device supported in said housing,
- means within said housing for connecting said device to a high voltage source,
- a fluid dielectric medium substantially filling said housing, said medium having a specific gravity greater than water,
- and means closing the opening at the top of said housing, said closing means including means for allowing water which accumulates on the surface of the dielectric medium to escape from said housing.

6. The apparatus according to claim 5 wherein said closing means includes a hollow extension and a cap adjustably mounted on said extension and said escape means includes porous means in the space between said cap and said extension.

7. The apparatus according to claim 5 wherein said fluid dielectric medium is selected from the group consisting of a halogenated ether and halogenated hydrocarbon.

8. The apparatus according to claim 5 wherein said closing means comprises an extension and a cap mounted for telescoping movement on said extension to adjust the top of said closing means to ground level, and wherein said escape means includes a layer of porous material positioned between said cap and said extension to allow water to escape from the top of said dielectric medium.

9. The apparatus according to claim 8 including means in said closing means for actuating said electrical device at ground level, said actuating means including an extension connected at said cap for movement with said cap.

* * * * *